(12) United States Patent
Gauderis et al.

(10) Patent No.: US 11,010,500 B2
(45) Date of Patent: May 18, 2021

(54) DIRECT ROOM MODELING IN COMPUTER-AIDED DESIGN

(71) Applicant: Bricsys NV, Ghent (BE)

(72) Inventors: Tjerk Gauderis, Ghent (BE); Sander Valcke, Denderleeuw (BE); Wouter Nys, Kortrijk (BE)

(73) Assignee: BRICSY NV, Ghent (BE)

( * ) Notice: Subject to any disclaimer, the term of this patent is extended or adjusted under 35 U.S.C. 154(b) by 353 days.

(21) Appl. No.: 16/207,403

(22) Filed: Dec. 3, 2018

(65) Prior Publication Data
US 2020/0089819 A1 Mar. 19, 2020

(30) Foreign Application Priority Data

Sep. 17, 2018 (EP) .................................. 18194897

(51) Int. Cl.
*G06F 30/13* (2020.01)
*G06T 11/20* (2006.01)

(52) U.S. Cl.
CPC ............ *G06F 30/13* (2020.01); *G06T 11/203* (2013.01)

(58) Field of Classification Search
CPC ............................... G06F 30/13; G06T 11/203
USPC ............................................................. 703/1
See application file for complete search history.

(56) References Cited

U.S. PATENT DOCUMENTS

| | | | | |
|---|---|---|---|---|
| 2005/0081161 A1* | 4/2005 | MacInnes | ................ | G06K 9/00 715/765 |
| 2007/0171223 A1 | 7/2007 | McArdle | | |
| 2008/0015823 A1* | 1/2008 | Arnold | ...................... | G06F 8/20 703/1 |
| 2008/0125892 A1* | 5/2008 | Hoguet | .............. | G06Q 30/0601 700/98 |
| 2008/0126022 A1* | 5/2008 | Hoguet | ................... | G06F 30/13 703/1 |
| 2009/0138113 A1* | 5/2009 | Hoguet | ................... | G06F 30/13 700/98 |
| 2009/0160856 A1* | 6/2009 | Hoguet | ................... | G06T 17/00 345/420 |

(Continued)

OTHER PUBLICATIONS https://www.youtube.com/watch?v=eP2MBKQJt0Q, entitled "BricsCAD BIM Basics—How to create walls" (2014).

(Continued)

*Primary Examiner* — David T Welch
(74) *Attorney, Agent, or Firm* — Maschoff Brennan

(57) ABSTRACT

The present invention concerns a computer-implemented method, a computer system and a computer program product for direct room modeling in a CAD model. The CAD model comprises a rectangular coordinate system comprising mutually orthogonal height, first horizontal and second horizontal directions. A first position and subsequently a second position within the model are obtained via a user input device. The first and second positions define a rectangle perpendicular to the height direction and aligned with the horizontal directions. The rectangle comprises edges and corners. The rectangle comprises the first and second positions at diagonally opposite corners. A room drawing operation is automatically performed based on the rectangle. One or more walls and/or wall portions, each extending in the height direction and along an edge of the rectangle over in essence the full length of the edge, are thereby inserted or removed.

16 Claims, 8 Drawing Sheets

(56) References Cited

U.S. PATENT DOCUMENTS

| | | | | |
|---|---|---|---|---|
| 2013/0173223 | A1* | 7/2013 | Teller | G06N 20/00 |
| | | | | 703/1 |
| 2015/0331970 | A1* | 11/2015 | Jovanovic | G06T 19/006 |
| | | | | 703/1 |
| 2018/0197340 | A1* | 7/2018 | Loberg | G06F 30/00 |
| 2020/0082633 | A1* | 3/2020 | Rom | G06F 30/20 |

OTHER PUBLICATIONS https://www.youtube.com/watch?v=s_OnapMenJE, entitled "AutoCAD Classes Fast 3D Wall" (2014).
Bricsys: "BricsCAD for AUTOCAD Users—3D BIM Design, 10th Ed.", Jan. 11, 2017, pp. 222-228.
Bricsys: "BricsCAD BIM Basics—How to create walls", Youtube, Nov. 25, 2014, p. 1.

\* cited by examiner

DIRECT ROOM MODELING IN COMPUTER-AIDED DESIGN

This application claims the benefit of European Application No. EP18194897.7 filed Sep. 17, 2018, which is hereby incorporated by reference in its entirety as if fully set forth herein.

TECHNICAL FIELD

The invention pertains to the technical field of computer-aided design (CAD), and in particular building information modeling.

BACKGROUND

Drawing walls and slabs for a building in a computer-aided design (CAD) model, such as a building information model (BIM), typically requires many user operations.

In BricsCAD BIM (e.g. V14) a wall can be created via the POLYSOLID command. Multiple walls can be connected via the BIMCONNECT command. A corresponding slab can be inserted via boundary detection and the EXTRUDE command. See, for example, https://www.youtube.com/watch?v=eP2MBKQR00, entitled "BricsCAD BIM Basics—How to create walls" (2014).

In AutoCAD (e.g. AutoCAD 2013) a two-dimensional outline for multiple walls can be drawn via the PLINE command. Walls associated with the outline can be added via the POLYSOLID command, by specifying a height and a thickness, and by further specifying (a part of) the outline as starting point. See, for example, https://www.youtube.com/watch?v=s OnapMenJE, entitled "AutoCAD Classes Fast 3D Wall" (2014). Once walls are drawn, a slab can be added.

Both prior art examples allow to model connected walls and a corresponding slab via a procedure involving a plurality of sequential steps. Both prior art examples remain silent on creation of 3D spaces directly. Both prior art examples remain silent on automatic determination of wall connections. Both prior art examples remain silent on adding an additional building story to a CAD model.

There remains a need in the art for direct modeling of three-dimensional spaces, bounded by multiple properly connected three-dimensional walls and a corresponding floor slab. This facilitates rapid conceptual architectural design.

The present invention aims to resolve at least some of the problems mentioned above.

SUMMARY OF THE INVENTION

In a first aspect, the present invention provides a computer-implemented method (CIM) for direct room modeling in a computer-aided design (CAD) model, according to claim 1.

In a second aspect, the present invention provides a computer system for direct room modeling in a CAD model, whereby the computer system is configured for performing the CIM according to the first aspect.

In a third aspect, the present invention provides a computer program product (CPP) for direct room modeling in a CAD model, whereby the CPP comprises instructions which, when the CPP is executed by a computer, cause the computer to carry out the CIM according to the first aspect.

The present invention may further provide a tangible non-transitory computer-readable data carrier comprising the CPP.

The present invention produces a technical effect on the CIM, computer system and CPP. The technical effect resides in the alteration of the CIM, computer system and CPP to allow for direct room modeling. The first and second position define lengths for walls and/or wall portions, based on which walls and/or wall portions extending in the height direction can automatically be inserted or removed. A corresponding slab is preferably automatically inserted, adjusted or removed accordingly.

DETAILED DESCRIPTION OF THE INVENTION

Figure 1:
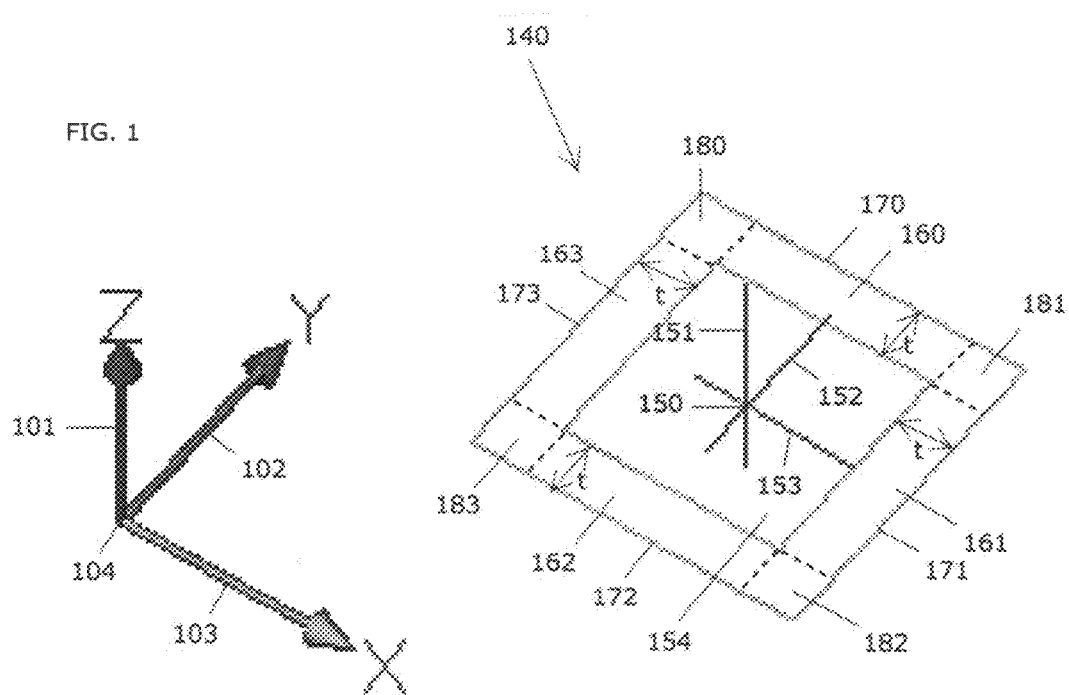
FIG. 1 shows a perspective view of an embodiment of a room cursor (140) according to the present invention. The room cursor can be snapped to objects, such as an origin (100), for example, as shown in FIG. 2.

The present invention concerns a computer-implemented method (CIM), a computer system, and a computer program product (CPP) for direct room modeling in a computer-aided design (CAD) model. The present invention has been summarized in the corresponding section above. In what follows, the present invention is described in detail, preferred embodiments are discussed, and the invention is illustrated by means of non-limiting examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specify the presence of what follows e.g. component and do not exclude or preclude the presence of additional, non-recited components, features, elements, members, steps, known in the art or disclosed therein.

A "computer-aided design model" (CAD model), as used herein, comprises computer-processable data, preferably digital data, about one or more solids, said data representing, or allowing to derive, properties of the solids, such as geometric properties, material properties and/or semantic properties. Said data may also represent, or may allow to derive, relative geometric properties between solids. A CAD model, as used herein, is preferably a building information model (BIM). A CAD model, as used herein, comprises a height direction.

A "wall", as used herein, is a solid comprising at least six faces. A wall comprises two mutually parallel reference faces, two end faces, a top face and a bottom face. The reference faces are parallel to the height direction. A wall furthermore comprises a length direction parallel to the reference faces and a normal direction perpendicular to the reference faces. The height, length and normal directions are mutually perpendicular. The reference faces of a wall define three regions: a first side of the wall, a second side of the wall obverse to the first side, and an inside of the wall in between the first and second sides of the wall. The top and bottom faces are preferably perpendicular to the height direction. The end faces are preferably parallel to the height direction. An end face of a wall comprises a non-zero angle with the reference faces of the wall. An end face of a wall is non-parallel to the length direction of the wall. An end face of a wall may or may not be parallel to the normal direction of the wall. A wall furthermore comprises a thickness, i.e. the spatial separation of its reference faces along its normal direction. A wall furthermore comprises a height, i.e. a minimal spatial separation of the top and bottom faces along the height direction. A wall furthermore comprises a length, i.e. a minimal spatial separation of the end faces along the length direction. The thickness of a wall is preferably substantially smaller than the length and the height.

A "slab", as used herein, is a solid. A slab comprises two parallel faces, a top face and a bottom face, both perpendicular to the height direction. A slab further comprises a thickness, being the distance in between the top and bottom faces.

A CAD model may be edited via a corresponding CPP, so-called CAD software. A non-limiting list of CAD software comprises 123D, ACIS, Advance Concrete, Advance Design, Advance Steel, AllyCAD, ArchiCAD, AutoCAD, BricsCAD, BRL-CAD, C3D, Caddie, Cadwork, CATIA, Chief Architect, Cobalt, Creo, DataCAD, DesignSpark Mechanical, Digital Project, Drawing Express, FINE MEP, form•Z, FreeCAD, HiCAD, IDEA Architectural, Inventor, IRONCAD, ItelliCAD, KeyCreator, LibreCAD, MEDUSA, MicroStation, Modelur, NanoCAD, NX, OpenCASCADE, OpenSCAD, Parasolid, PTC Creo, PowerCADD, progeCAD, PunchCAD, QCad, Revit Architecture, Revit MEP, Revit Structure, Rhinoceros 3D, RoutCad, SALOME, ShapeManager, SketchUp, Solid Edge, SolidWorks, SolveSpace, SpaceClaim, SpaceClaim Engineer, Tekla Structures, TopSolid, TransMagic, TurboCAD, VariCAD, VectorWorks, and VisualARQ. A non-limiting list of BIM software comprises Allplan, ArchiCAD, ARCHLine.XP, Autodesk Revit, BricsCAD, CodeBook, DDS-CAD, Digital Project, FINE MEP, GRAITEC Advance, IDEA Architectural, MicroStation, Navisworks, OpenStudio, RFEM, Tekla BIMsight, Tekla Structures, Trimble SketchUp, VectorWorks Architect, Vico Office, and VisualARQ. One of ordinary skill in the art will appreciate that while the present invention preferentially involves a BIM, it may also be used for CAD models in different fields, such as, for example, computer-aided architectural design or mechanical engineering.

In a first aspect, the present invention provides a CIM for direct room modeling in a CAD model, preferably a BIM, comprising several steps. In a second aspect, the present invention provides a computer system for direct room modeling in a CAD model, preferably a BIM, whereby the computer system is configured for performing the CIM according to the first aspect. The computer system comprises at least one processor for carrying out the steps of the CIM according to the first aspect. In a third aspect, the present invention provides a CPP for direct room modeling in a CAD model, preferably a BIM, whereby the CPP comprises instructions for performing the CIM according to the first aspect. The third aspect in particular provides a CPP for direct room modeling in a CAD model, preferably a BIM, which, when the CPP is executed by a computer, such as a computer system according to the second aspect, cause the computer to carry out the CIM according to the first aspect. The third aspect may further also relate to a tangible non-transitory computer-readable data carrier comprising said CPP. The three aspects of the present invention are hence interrelated. Therefore, all features disclosed in this document, above or below, may relate to each of these aspects, even if they have been disclosed in conjunction with a particular aspect.

The CAD model comprises a rectangular coordinate system comprising mutually orthogonal height, first horizontal and second horizontal directions. A first position within the model is obtained via a user input device. Subsequently, a second position within the model is obtained via a user input device. The first and second positions define a rectangle perpendicular to the height direction and aligned with the horizontal directions. The rectangle comprises edges and corners. The rectangle comprises the first and second positions at diagonally opposite corners. Upon obtaining said second position, a room drawing operation is automatically performed based on the rectangle. One or more walls and/or wall portions, each extending in the height direction and along an edge of the rectangle over in essence the full length of the edge, are thereby inserted or removed. Preferably, a semantic classification is inserted in the CAD model for an inserted wall and/or wall portion.

One of ordinary skill in the art will appreciate that a wall and/or wall portion extending along an edge of the rectangle over "in essence the full length of the edge" may thereby comprise a length of in between: the edge length minus twice the wall thickness; and the edge length plus twice the wall thickness.

This is advantageous, as it allows for direct room modeling in a CAD model. The first and second positions define a rectangle comprising four edges and corners, whereby the rectangle comprises the first and second positions at diagonally opposite corners, based on which along one or more, preferably each, of its four edges a three-dimensional wall and/or three-dimensional wall portion can be inserted or removed. A room can thereby be directly modelled, for example by a first computer mouse click for obtaining the first position, a translation of the computer mouse for obtaining a tentative second position, i.e. for extending the rectangle, and a second mouse click for confirming the extended rectangle. Walls, and optionally, as explained below, also a slab, are thereby automatically adjusted. This is advantageous, as it allows for direct modeling of multiple connected three-dimensional walls, preferably in conjunction with a corresponding slab.

The model may comprise a base height and zero, one or more slabs. In a preferred embodiment, obtaining the first position within the model comprises obtaining a horizontal position via a user input device. The first position is then based on said horizontal position. The first position is in a top face of a slab in case a slab is present at said horizontal position, and the first position is at the base height otherwise. Preferably, the horizontal position comprises coordinates with respect to the first and second horizontal directions of the rectangular coordinate system. Preferably, the first position comprises a height coordinate in addition to the coordinates of the horizontal position. The height coordinate depends on whether or not a slab is present at the horizontal position. In case a slab is present at the horizontal position, the height coordinate corresponds to the top face of the slab. In case no slab is present at the horizontal position, the height coordinate corresponds to the base height. The user input device, such as a computer mouse, may be configured for inputting two-dimensional translations. An initial horizontal position and a two-dimensional translation determine a new horizontal position. The height may then be automatically determined based on presence of a slab at the new horizontal position and/or the height of a top face of said slab in case of presence.

A slab of the CAD model may be tangent to multiple outer walls, with the slab in between. The CAD model may furthermore comprise zero, one or more inner walls on top of the slab. In case the first position is at the base height, the room drawing operation preferably comprises inserting four outer walls and inserting a slab in between the four outer walls. Preferably, a semantic classification for the inserted slab is thereby automatically inserted. In case the first position is at the top face of a slab and the room drawing operation does not involve inserting or removing outer walls and/or outer wall portions, the slab is preferably left unchanged. In case the first position is at the top face of a slab and the room drawing operation involves inserting and/or removing outer walls and/or outer wall portions, the slab is preferably adjusted or removed accordingly.

In a preferred embodiment, obtaining said first position and subsequently said second position within the model via a user input device comprises the following steps. Said first position within the model is obtained via a user input device. A series of tentative second positions within the model is dynamically obtained via a user input device, e.g. a computer mouse. The first position and a tentative second position define a tentative rectangle perpendicular to the height direction and aligned with the horizontal directions. The tentative rectangle comprises edges and corners. The tentative rectangle comprises the first position and the tentative second position at diagonally opposite corners. A series of tentative rectangles corresponding in time with said dynamically obtained series of tentative second positions is dynamically displayed via a visualization means, e.g. a computer screen. A second position and/or rectangle is obtained by obtaining a confirmation of a tentative second position and/or tentative rectangle via a user input device, e.g. computer mouse button or keyboard key.

In a preferred embodiment, the first position is a pivot region. A wall thickness is obtained. The wall thickness may be, for example, a default value specified in the CPP, a user-specified value obtained from a tangible computer-readable storage medium, or a value entered by the user via a user input device, e.g. a keyboard. Preferably, obtaining the first position in the CAD model via a user input device comprises fixing the pivot region relative to the model via a user input device. Preferably, a plane perpendicular to the height direction comprises the pivot region. Preferably, the pivot region is a square pivot region. Preferably, the pivot region comprises four outer edges each comprising an edge length equal to the wall thickness. Preferably, each edge defines a line, whereby the lines partition the plane into nine sectors. Preferably, each sector is associated with a drawing operation. In this case, the second position is within a sector of said nine sectors, and the automatically performed room drawing operation is the drawing operation associated with the sector comprising said second position.

In a preferred embodiment, a polygonal pivot region is obtained in a plane perpendicular to the height direction. The polygonal pivot region comprises multiple outer edges each defining a line. These lines partition the plane into multiple sectors. Each sector is associated with a drawing operation. A second position in a sector of the plane is obtained via a user input device. The drawing operation associated with this sector is automatically performed. The drawing operation comprises inserting, removing and/or repositioning one or more walls and/or wall portions, each extending in the height direction and comprising a length perpendicular to the height direction based on said second position.

This is advantageous as it allows for simultaneously providing both a type of drawing operation and one or more dimensions for the drawing operation via obtaining said second position via a user input device. This is advantageous, as it allows for direct modeling of multiple connected three-dimensional walls, preferably in conjunction with a corresponding slab.

In a preferred embodiment, the polygonal pivot region is a rectangular pivot region. The rectangular pivot region comprises four outer edges, whereby each edge defines a line. The four lines partition the plane into nine sectors. More preferably, the polygonal pivot region is a square pivot region. A wall thickness may be obtained. Preferably, each edge of the square pivot region comprises an edge length equal to said wall thickness.

This is advantageous as the pivot region may be positioned within a wall or at a corner of two walls. Hereby, the CAD model may comprise a wall before said drawing operation or a wall may be introduced in the CAD model via said drawing operation.

In a preferred embodiment, said nine sectors comprise a central pivot sector, four corner sectors and four edge sectors. Hereby, the central sector is preferably associated with a void drawing operation. Hereby, each corner sector is preferably associated with a drawing operation comprising the insertion and/or removal of multiple walls and/or wall portions. Hereby, each edge sector is preferably associated with a drawing operation comprising the insertion or removal of one wall and/or wall portion.

In a preferred embodiment, the CIM comprises several steps to obtain said first position in the CAD model via a user input device. A planar rectangular room cursor is displayed via a visualization means. The room cursor comprises an inner rectangle and an outer band around the inner rectangle. The outer band comprises four edge parts. Each edge part comprises a width equal to the wall thickness. The room cursor may comprise a tentative cursor position:
- which dynamically depends on a tentative first position within the CAD model dynamically obtained via a user input device and/or
- which is at least partially constrained by one or two non-parallel snapped or constrained edge parts.

A pivot region may be fixed relative to the model by obtaining a confirmation of the tentative cursor position via a user input device. In case of no snapped or constrained edge parts, the pivot region is preferably fixed at a position centrally in the inner rectangle. In case of one snapped or constrained edge part, the pivot region is preferably fixed at a position centrally in the one edge part. In case of two non-parallel snapped or constrained edge parts, the pivot region is preferably fixed at a position of the corresponding corner of the two edge parts.

In a preferred embodiment, to obtain the square pivot region in a plane perpendicular to the height direction, a planar room cursor perpendicular to the height direction is displayed via a visualization means. The room cursor comprises a rectangle and a band around the rectangle. The band comprises four edge parts. Each edge part comprises a thickness equal to said wall thickness. Each edge part comprises an outer rim. A translation for the room cursor within the CAD model may be obtained via a user input device. A pivot region may be determined based on the translated room cursor. A pivot region may be determined based on proximity of the planar room cursor to objects within the CAD model. Examples of such objects comprise an origin of a coordinate system or walls of the CAD model.

A distance indicator may be shown in between the room cursor and a wall. In a preferred embodiment, the CAD model comprises a wall. The wall comprises a reference face parallel to the height direction. The reference face of the wall is parallel to the outer rim of an edge part of the band. The distance indicator is displayed via the visualization means between the outer rim of the edge part of the band and the reference face of the wall, upon spatial separation between the room cursor and the reference face of the wall. Preferably, the distance indicator comprises a line perpendicular to both the reference face of the wall and the outer rim of the edge part. Preferably, said line starts in the middle of the outer rim of the edge part in a direction outward with respect to the room cursor. The distance between the outer rim of the edge part of the band of the room cursor and the reference face of the wall may be constrained. A numerical value of the distance may be displayed via the visualization means. Via a user input device, a signal indicative of constraining the distance to the current numerical value or a signal comprising an overwriting numerical value for the distance may be received, and the distance may be constrained accordingly.

An edge part may be shown to snap into a wall. In a preferred embodiment, the CAD model comprises a wall. The wall comprises two parallel reference faces parallel to the height direction and a thickness in between the two parallel reference faces equal to the wall thickness. The two parallel reference faces are further parallel to the outer rim of an edge part of the band of the room cursor. The edge part is displayed via the visualization means to snap into the wall upon intersection of the edge part with the wall. A snap wall may thereby be displayed via the visualization means. The snap wall is a box on top of the edge part and along the edge part. The snapwall may comprise a distinct color, such as, for example, blue. The snapwall may comprise a height proportional to the wall thickness, such as, for example, a height equal to 80% of the wall thickness. One of ordinary skill in the art will appreciate that said snapping may persist for a translation dimension perpendicular to said wall equal to two times the wall thickness.

The room cursor may be shown to snap onto a coordinate system of the CAD model. In a preferred embodiment, the CAD model comprises a coordinate system. The coordinate system comprises an origin, a height direction, and two mutually orthogonal horizontal directions. Each horizontal direction is parallel to an outer rim of an edge part of the band of the room cursor. Two outer rims of the edge parts of the band are displayed via the visualization means to snap onto the origin of the coordinate system in case a distance between each of said translated outer rims and said origin is smaller than a predefined threshold. Two joining snap walls, or alternatively an L-shaped snap wall, may thereby be displayed via the visualization means. The two snap walls or L-shaped snap wall are positioned on top of said two edge parts, may comprise a distinct color, and may comprise a height proportional to the wall thickness, as before.

The pivot region may be determined based on the translated room cursor and on proximity of the room cursor to objects within the CAD model. In a preferred embodiment, in case two non-parallel edge parts of the band are fixed based on snapping or constraining a distance, the pivot region is positioned in the band at the corresponding corner of the two fixed edge parts. In this embodiment, in case one edge part of the band is fixed based on snapping or constraining a distance, the pivot region is positioned in the band and centrally in the fixed edge part. In this embodiment, in case zero edge parts of the band are fixed, the pivot region is positioned centrally in the rectangle of the room cursor. Hereby, fixing of an edge part of the band based on constraining a distance may involve receiving a corresponding constraining signal via a user input device, such as, for example, a signal indicative of constraining the distance to the current numerical value or a signal comprising an overwriting numerical value for the distance. Hereby, fixing of an edge part of the band based on snapping may involve merely moving the edge part sufficiently close to an object of the CAD model so that the edge part is snapped into or onto the object of the CAD model, such as, for example, into a wall upon intersection of an edge part with the wall or onto an origin of a coordinate system based on a predefined distance threshold.

FIG. 1 shows a perspective view of an example of an embodiment of a room cursor (140) according to the present invention, preferably as displayed to a user via a visualization means, such as a computer screen, multiple computer screens, a projector, or the like. One of ordinary skill in the art will appreciate that each of FIGS. 1, 2, and 4 to 16, may be a graphical representation or a portion of a graphical representation as displayed to a user via a visualization means.

Figure 2:
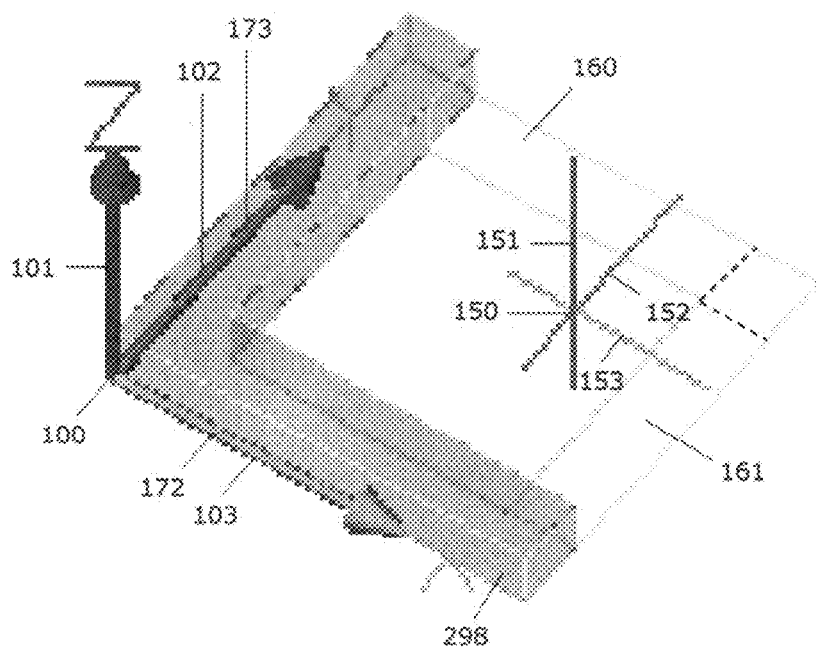

The CAD model comprises a coordinate system. The coordinate system comprises an origin (100), a height direction (101, Z), and two mutually orthogonal horizontal directions (102, Y; 103, X). Furthermore, a position cursor (150, 151, 152, 153) is displayed. The position cursor preferably tracks the movements obtained from a user input device, such as a computer mouse, a touchpad, a trackball, or the like. A planar room cursor (140) is associated with the position cursor (150). The planar room cursor (140) is perpendicular to the height direction (101, Z). The room cursor comprises an inner square (154) and a band (160, 161, 162, 163, 180, 181, 182, 183) around the inner square (154). The inner square comprises an edge length, e.g. 1 m (numerical value 1000). The band comprises four edge parts (160, 161, 162, 163). Each edge part comprises a thickness (t), perpendicular to the height direction (101, Z), equal to the wall thickness, e.g. 25 cm (numerical value 250). Each edge part (160, 161, 162, 163) comprises an outer rim (170, 171, 172, 173). Each outer rim is parallel to one of the horizontal directions of the coordinate system. Each pair of non-parallel edge parts comprises a corresponding corner, e.g. non-parallel edge parts (160) and (161) comprise corresponding corner (181). Upon translating the position cursor (150, 151, 152, 153) sufficiently close to the origin of the coordinate system of the CAD model, i.e. whereby outer edges (162) and (163) comprise a distance to the origin smaller than a predefined threshold, e.g. the combined distance of two times the band width (t) and the side of the inner square (140), the room cursor is shown to snap onto the coordinate system, preferably in the first quadrant of the plane perpendicular to the height direction, as is shown in FIG. 2. Thereby, the outer rim (172) of edge part (162) is shown to snap onto direction (103, X) and the outer rim (173) of edge part (163) is shown to snap onto direction (102, Y). In this case, these two non-parallel edge parts (162, 163) of the band are fixed based on said snapping, and the pivot region is positioned in the band at the corresponding corner (183) of the two fixed edge parts (162, 163). Optionally, a confirmation of the positioned pivot region may be obtained via a user input device, e.g. by clicking a computer mouse button, a touchpad, a trackball button, or the like.

Figure 3:
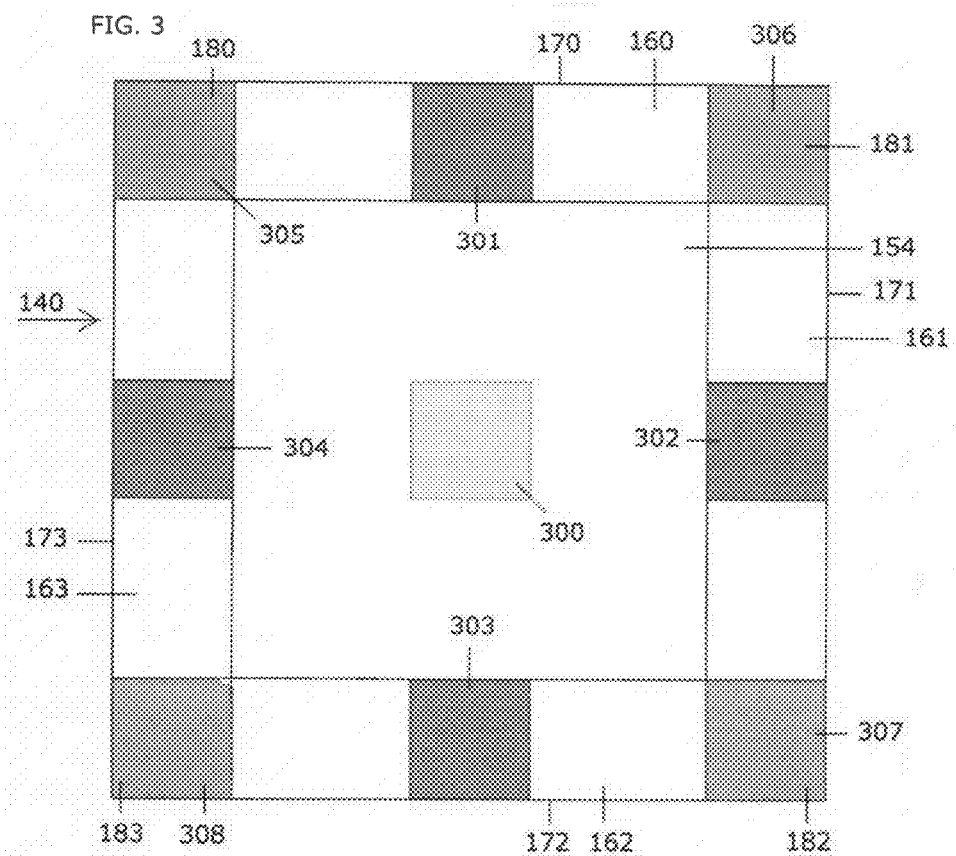
FIG. 3 shows a top view of an embodiment of a planar room cursor (140) and several locations (300, 301, 302, 303, 304, 305, 306, 307, 308) within the room cursor, which may be associated with a pivot region depending on the context.

FIG. 3 shows a top view of an embodiment of a planar room cursor (140) and nine locations (300, 301, 302, 303, 304, 305, 306, 307, 308) within the room cursor, which may be associated with a pivot region depending on the context. In case two non-parallel edge parts are fixed, the pivot region is positioned in a corresponding corner location (305, 306, 307, 308). In case one edge part is fixed, the pivot region is positioned at a corresponding central location (301, 302, 303, 304) within the edge part. In case zero edge parts are fixed, the pivot region is positioned centrally in the rectangle (154) of the room cursor.

In a preferred embodiment, once a position for the square pivot region is obtained, the plane of the pivot region is partitioned into nine sectors by the four lines defined by the outer edges of the square pivot region. The nine sectors are:
 a central pivot sector, in essence coinciding with the pivot region itself;
 four edge sectors, each edge sector tangent to an edge of the pivot region and unbounded in a direction perpendicular to said edge and to the height direction; and
 four corner sectors, each corner sector tangent to a corner of the pivot region and unbounded in two directions of the plane.

Preferably, the plane is partitioned into non-overlapping sectors, whereby each position in the plane corresponds with a sector.

A position in a sector of the plane is obtained via a user input device, for example via a computer mouse. This position may be defined by a set of coordinates, such as, for example, two-dimensional coordinates within the plane, three-dimensional coordinates with respect to the coordinate system of the CAD model, or the like. A drawing operation associated with this sector is automatically performed. The drawing operation depends on the sector. The drawing operation may further depend on the relative location of the sector with respect to the location of the room cursor upon obtaining said pivot region. Specific embodiments of the latter case are elaborated upon below.

Hereby, the central pivot sector may be associated with a void drawing operation. The void drawing operation may involve a release of the pivot region, whereby a previously fixed positioned pivot region becomes unfixed, allowing free unconstrained movement of the planar room cursor. Each corner sector may be associated with a room or building drawing operation, comprising the insertion, removal and/or repositioning of multiple walls and/or wall portions. Each edge sector may be associated with a wall drawing operation involving the insertion or removal of one wall and/or wall portion.

Removal of a wall may be achieved by movement of the cursor through a wall. A square pivot region may be located inside a wall via snapping of an edge part of the room cursor into the wall, and the rectangle of the room cursor comprising the snapped edge part may thereby be positioned at a first side of the wall. In a preferred embodiment, a position in a corner sector is obtained via a user input device, whereby the position is on a second side of the wall obverse to the first side. Said wall or a portion of said wall is then removed, and two or more walls and/or wall portions are inserted based on said obtained position.

The wall into which is snapped may be retained by staying on the same side of the wall. A square pivot region may be located inside a wall via snapping of an edge part of the room cursor into the wall, and the rectangle of the room cursor comprising the snapped edge part may thereby be positioned at a first side of the wall. In a preferred embodiment, a position in a corner sector is obtained via a user input device, whereby the position is on the first side of the wall. Two or more walls and/or wall portions are inserted based on said obtained position, at least one of which is connected to said wall comprising the pivot region.

Removal of a wall may be achieved by obtaining a pivot region and a position within said wall. A square pivot region may be located inside a wall via snapping of an edge part of the room cursor into the wall. In a preferred embodiment, a position in an edge sector is obtained via a user input device, whereby said position is inside said wall. A wall portion of said wall is thereupon removed, comprising a length and a location based on said pivot region and said position.

A square pivot region may be located inside a wall via snapping of an edge part of the room cursor into the wall. In a preferred embodiment, the inner rectangle of the room cursor comprising the snapped edge part is positioned at a first side of the wall, wherein:
 in case the second position lies in a corner sector on a second side of the wall obverse to the first side, said wall or a portion of said wall is removed; and two or more walls and/or wall portions are inserted on the second side of the wall based on said second position;
 in case the second position lies in a corner sector on the first side of the wall, two or more walls and/or wall portions are inserted on the first side of said wall based on said second position, at least one of which is connected to said wall; and
 in case the second position lies in an edge sector and inside said wall, removing a wall portion of said wall comprising a length and a location based on said pivot region and said second position.

In a preferred embodiment, a connection type between at least two walls, such as two, three or four walls, is automatically adjusted upon obtaining said position which triggers said drawing operation involving at least one of said at least two walls, based on a predetermined heuristic set of rules. A non-limiting example of a predetermined heuristic set of rules may comprise one or more, and preferably all, of the following rules:
 If a wall A joins a wall B in a T-connection, whereby an end face of wall A is tangent to, touches or intersects a reference face of wall B, said end face of wall A is adjusted to coincide with said reference face of wall B.
 If two walls comprise the same wall thickness and join collinearly, i.e. each reference face of a wall A is coplanar with a reference face of a wall B, the two walls are joined into one long wall.
 If a wall A joins a wall B under a connection angle, i.e. an angle between their length directions, whereby an end face of wall A is tangent to, touches or intersects an end face of wall B, said end faces are adjusted to coincide and to comprise an angle with the respective length directions equal to half said connection angle.
 If three walls join in a T-connection, two collinear and equally thick walls are joined into one long wall, whereby an end face of a third wall is tangent to, touches, or intersects a reference face of the joined wall, said end face of the third wall is adjusted to coincide with said reference face of said joined wall.

If four walls join in a cross-connection, with two pairs of collinear and equally thick walls, the pair with the longest total length is joined into one long wall, and the other walls are provided with end faces coinciding with one of the reference faces of the joined wall.

In a most preferred embodiment, the model comprises a base height and zero, one or more slabs. The pivot region is obtained via a horizontal translation within the model obtained via a user input device. Said plane is tangent to a top face of a slab in case said horizontal translation within the CAD model corresponds to a horizontal position associated with a slab, and said plane is positioned at base height otherwise. Said drawing operation thereby comprises leaving the slab unchanged, adjusting the slab, or removing the slab in case said plane is tangent to a top face of said slab; and inserting a slab in case said plane is positioned at the base height. When the plane is tangent to the top face of a slab, 'inner' walls may be inserted comprising a bottom face tangent to the top face of the slab, i.e. inner walls on top of the slab. Otherwise, when the plane is at base height, 'outer' walls comprising a bottom face at base height may be inserted.

The model may comprise a building story comprising a slab and one or more walls. The building story may comprise a slab, multiple outer walls and zero, one or more inner walls. Via a visualization means an addition widget in conjunction with the building story may be displayed. A selection of an addition action may be obtained via a user input device, preferably via said addition widget. In the latter case, a selection of the addition widget is obtained via a user input device. A duplication of said building story may be automatically inserted, preferably on top of said building story, upon obtaining said selection of said addition widget.

With reference to the example illustrated in FIG. 2, a pair of three-dimensional walls (298) extending in the height direction (101, Z) and comprising a thickness equal to said wall thickness (t) is displayed via the visualization means to emerge on top of the fixed edge parts, to indicate a drawing operation associated with the current position of the pivot region and the position cursor. Upon obtaining a confirmation of the positioned pivot region via a user input device, a drawing cursor is shown comprising a size which depends on the positioned pivot region and the position cursor.

Figure 4:
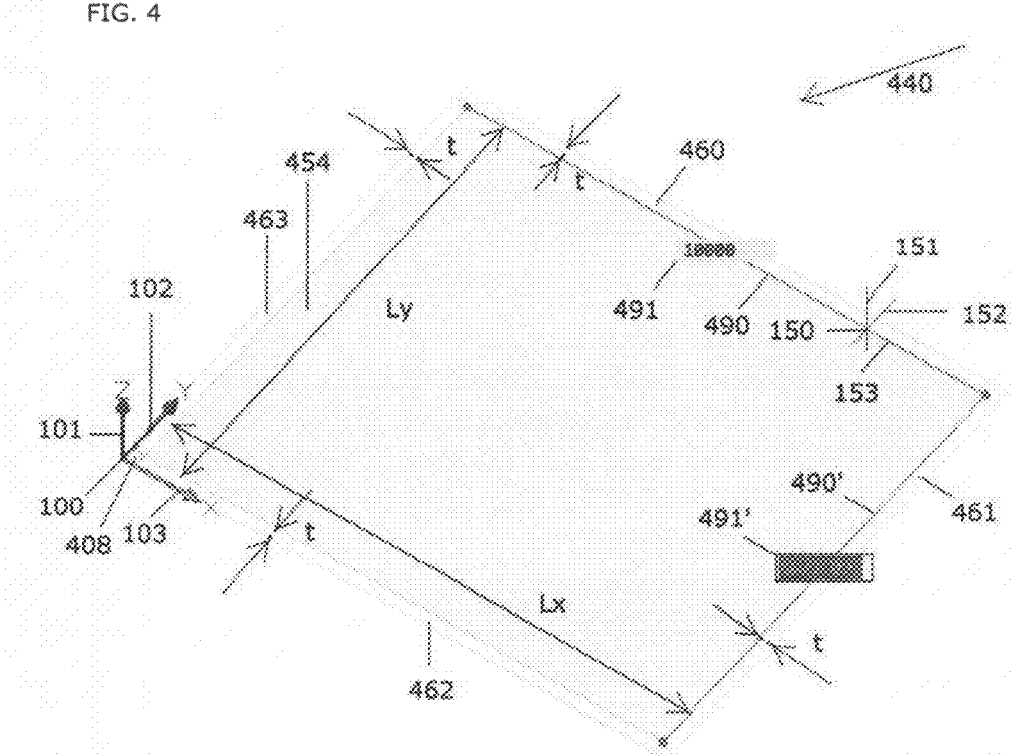
FIGS. 4 to 16 show a sequence of perspective views of a computer-aided design model, illustrating a sequence of modeling operations as may be performed according to an embodiment of the present invention.

In FIG. 4, an example of a drawing cursor (440) is shown, upon confirming the location (408) of the pivot region at the origin (100) of the coordinate system. Note that the position cursor (150) is located in a corner sector of the pivot region. Said corner sector is associated with the insertion of a rectangular slab, as no slab is present at the origin, and four outer sidewalls, with bottom face at zero elevation, i.e. base height. The drawing cursor (440) comprises an inner rectangle (454) comprising an inner first dimension (Lx) and an inner second dimension (Ly). The drawing cursor further comprises an outer band, comprising four edge parts (460, 461, 462, 463), whereby each edge part comprises a thickness (t) equal to said wall thickness. Initially, the size of the inner rectangle is entirely determined by the position cursor (150). In FIG. 4, two distance indicators (490, 491; 490', 491') are displayed, indicating the spatial separations of the walls to be inserted, corresponding to the dimensions of the inner rectangle (454). Each distance indicator comprises a line (490, 490') in between two pairs of walls and a corresponding numerical value (491, 491') of the corresponding distance. The user may constrain the first inner dimension (Lx) by overwriting the numerical value of the corresponding distance indicator, as has been performed at the particular instance shown in FIG. 4. The remaining unconstrained distance, corresponding to the inner second dimension (Ly) remains, at first, determined by the position cursor, and may, subsequently, also be constrained by the user.

A person of ordinary skill in the art will appreciate the similarities between the room cursor and the drawing cursor, and will further appreciate that both terms refer to a particular tool cursor, in a state prior and posterior, respectively, to positioning the pivot region.

Figure 5:
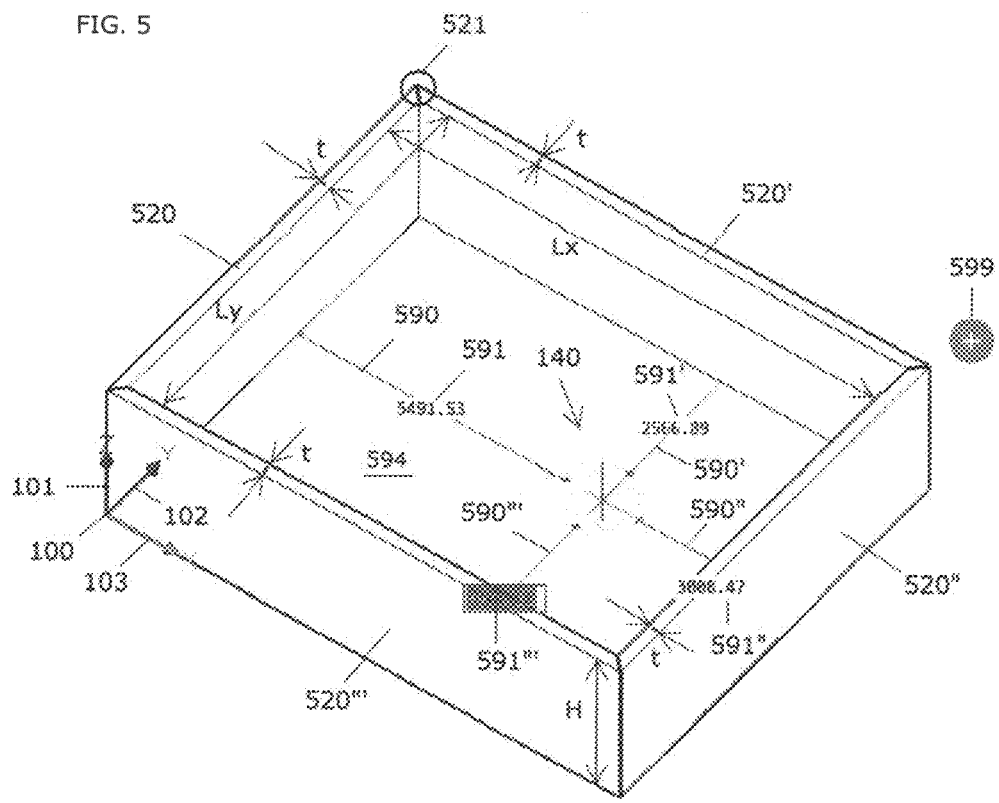

Upon constraining Lx and Ly, e.g. to 10 m (numerical value 10000) and 8 m (numerical value 8000), respectively, a slab (594) and four corresponding outer walls (520, 520', 520", 520''') are inserted into the CAD model, as shown in FIG. 5. The outer walls comprise a thickness equal to said wall thickness (t) and a common predefined height (H). The connections (521, 521', 521", 521''') between the perpendicularly joining walls are 45° miters. The position cursor and a corresponding room cursor (140) are located on a top face of the slab. As the room cursor (140) is spatially separated from the walls (520, 520', 520", 520'''), distance indicators are displayed in between the outer rims of the edge parts of the band of the room cursor and the corresponding walls. Each distance indicator comprises a line (590, 590', 590", 590''') and a corresponding numerical value (591, 591', 591", 591'''). The slab and the four outer walls form a building story. An addition widget (599) is displayed in conjunction with the building story.

Figure 6:
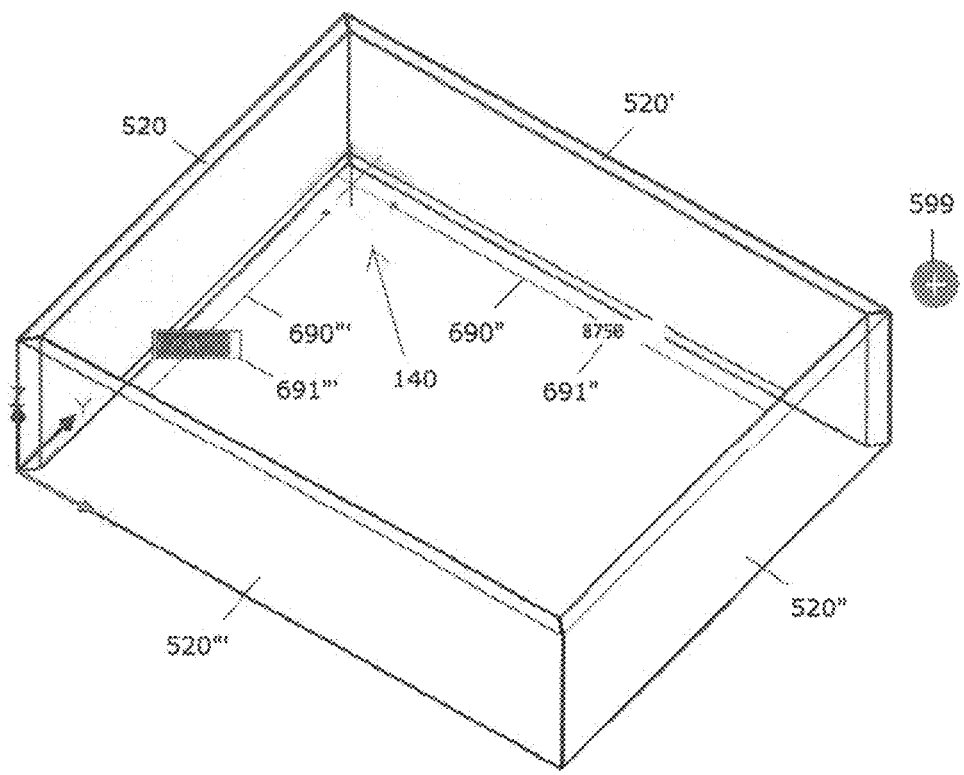

In FIG. 6, the position cursor has been moved proximate to walls (520) and (520'), and two non-parallel edge parts of the band of the room cursor (140) are shown to be snapped into these walls, via a snap wall visualization on top of the two snapped edge parts. Corresponding distance indicators (690", 691"; 690''', 691''') are shown for the outer rims of the other edge parts of the room cursor. The pivot region is positioned correspondingly at the corner of the room cursor at the connection of the walls (520) and (520'), which are highlighted to emphasize the snapping of the room cursor at these walls. Upon obtaining a confirmation of the positioned pivot region via a user input device, a drawing cursor is shown comprising a size which depends on the positioned pivot region and the position cursor.

Figure 7:
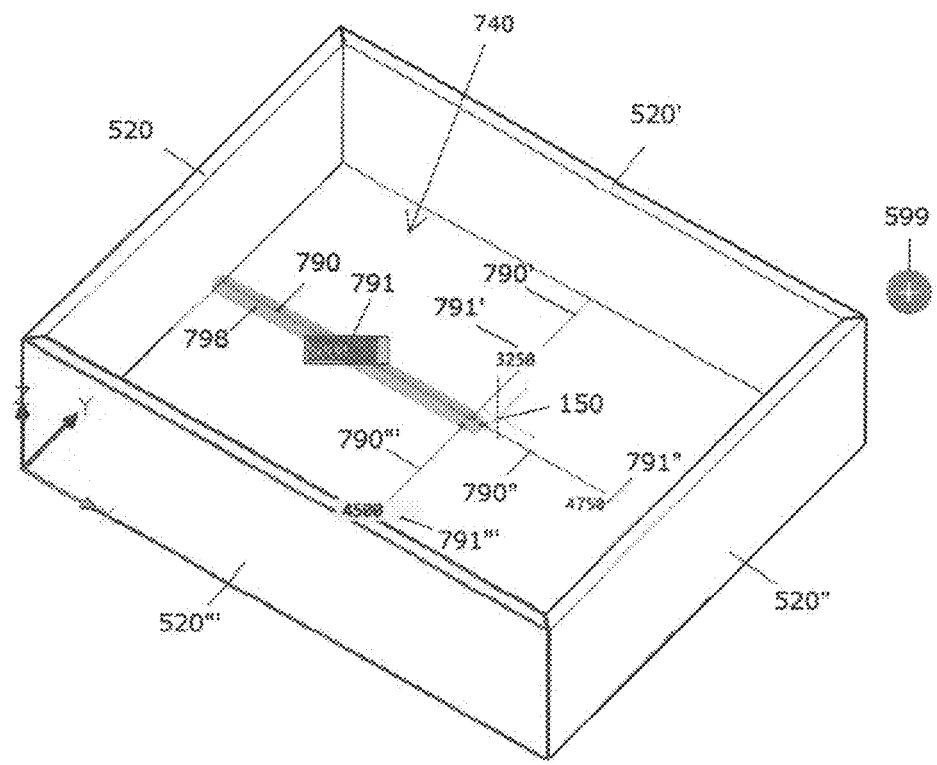

In FIG. 7, an example of a subsequent drawing cursor (740) is shown. Note that the position cursor is located in a corner sector of the positioned pivot region. Note further that the position cursor is also located within the four walls, and is therefore positioned at the same side of walls (520) and (520') as the room cursor in FIG. 6. The drawing cursor comprises an inner rectangle, and an outer band of thickness (t) equal to the wall thickness around the inner rectangle. Initially, the dimensions of the inner rectangle are entirely determined by the positioned pivot region and the position cursor. FIG. 7 furthermore shows four distance indicators (790, 791; 790', 791'; 790", 791"; 790''', 791''') from the free corner of the drawing cursor. The user may constrain a first distance by overwriting the numerical value of the corresponding distance indicator (790, 791), e.g. to 5 m (numerical value 5000), as is being performed at the particular instance shown in FIG. 7. During constraining of a distance, a three-dimensional snap wall (798) extending in the height direction and comprising a thickness equal to said wall thickness (t) is displayed via the visualization means to emerge on top of the edge part of the band of the drawing cursor, for which the length is being constrained. The remaining unconstrained distance remains, at first, determined by the position cursor, and may, subsequently, also be constrained by the user.

Figure 8:
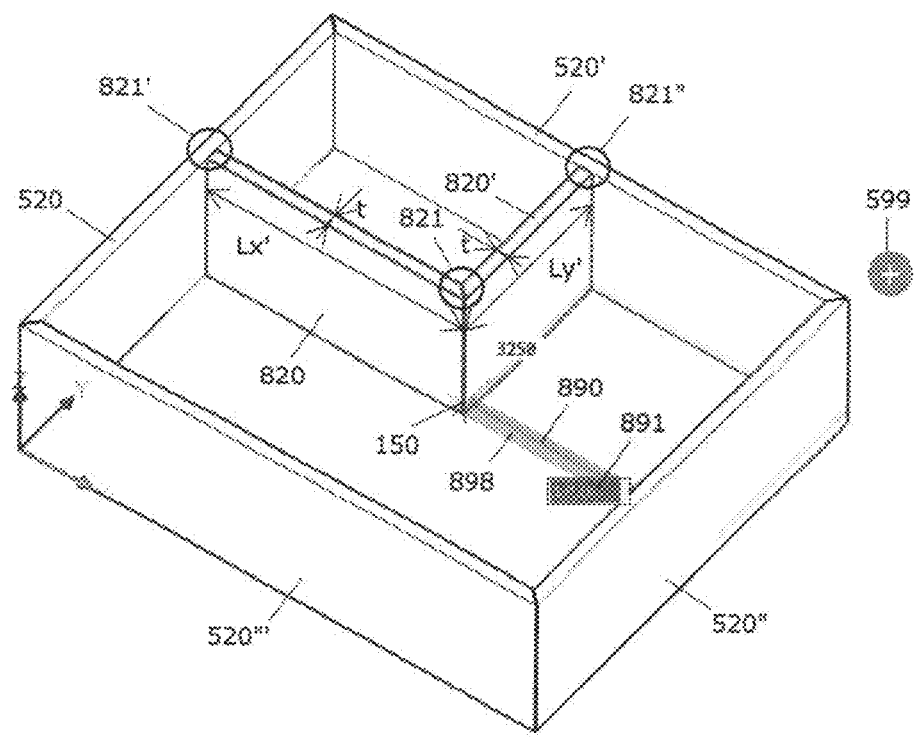
Figure 9:
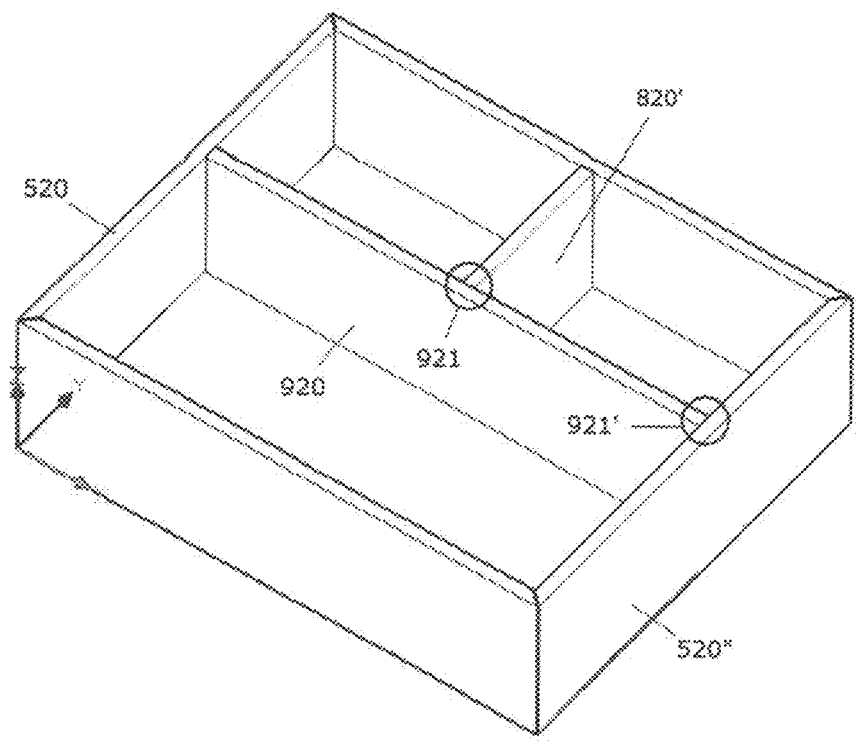

Upon constraining both distances and obtaining confirmation via a user input device, e.g. by clicking a computer mouse button, corresponding inner walls (820, 820') are inserted into the CAD model on top of the top face of the slab, as shown in FIG. 8. The inner walls comprise a thickness (t) equal to said wall thickness and a top face at an equal height as the top faces of the already inserted outer walls. As the inner faces are positioned on top of the slab, they comprise a height equal to the height (H) of the already inserted outer walls (520, 520', 520", 520''') minus the thickness of the slab. The connections (821, 821', 821") between the walls are adjusted automatically according to the predetermined heuristic set of rules. Upon performing similar actions from the corner in which walls (520') and (520") join, thereby constraining the distance of distance indicator (890, 891) to the distance in between walls (820') and (520"), while a corresponding three-dimensional snap wall (898) is displayed, a wall is inserted. The just inserted wall and previously inserted wall (820) are collinear and equally thick, and therefore automatically joined into one long joined wall (920), as shown in FIG. 9. Connection (921) with wall (820') and connection (921') with wall (520") are adjusted correspondingly.

Figure 10:
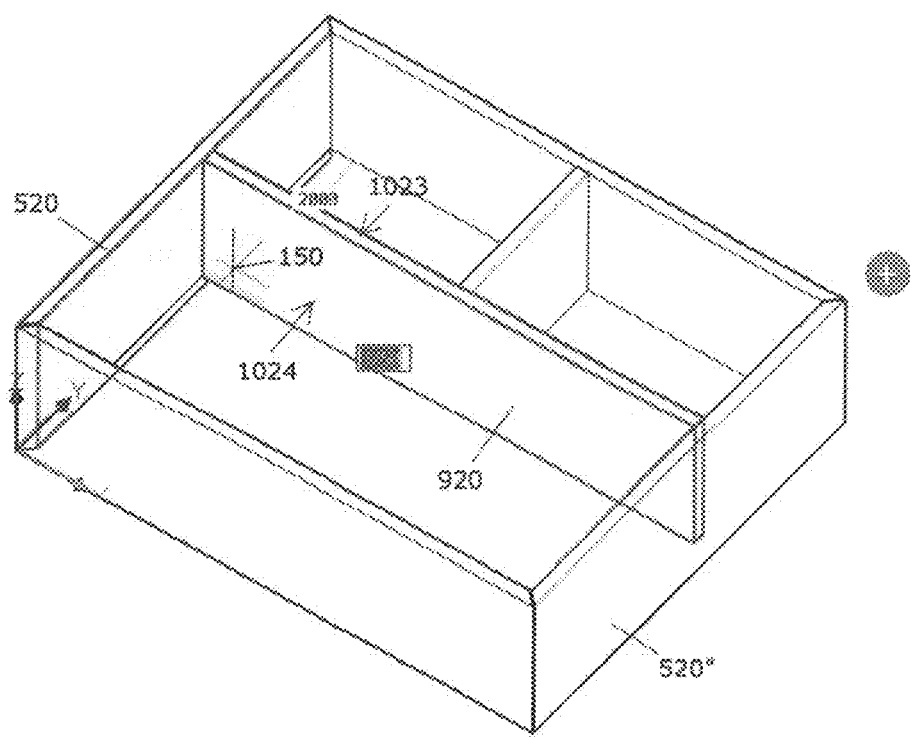

Reference is made to FIG. 10. Wall (920) comprises a first reference face (1023) and a second reference face (1024), defining a first side of the wall and a second side of the wall, respectively. The position cursor and the corresponding room cursor are located at the first side of wall (920). Two non-parallel edge parts of the band of the room cursor are shown to be snapped into walls (920) and (520), respectively, as the position cursor (150) is suitably positioned. The pivot region is positioned in the corner corresponding to the connection of walls (920) and (520). Upon obtaining a confirmation of the positioned pivot region via a user input device, a drawing cursor is shown comprising a size which depends on the positioned pivot region and the position cursor.

Figure 11:
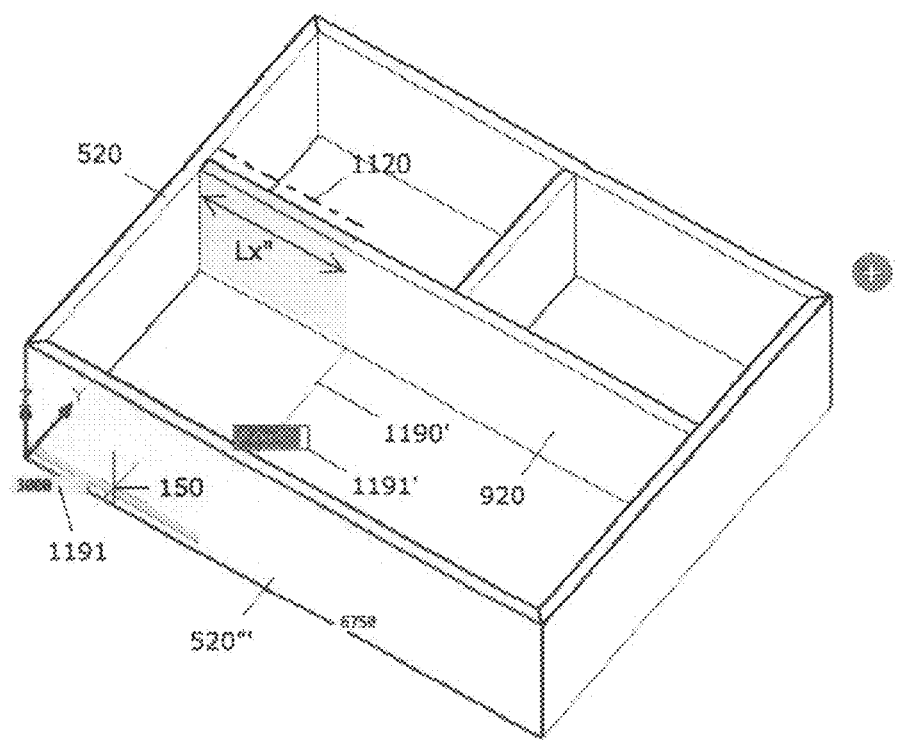

In FIG. 11, an example of a subsequent drawing cursor is shown. Note that the position cursor is located in a corner sector of the positioned pivot region. Note further that the position cursor is also located on the second side of wall (920) obverse to the first side. A wall portion (1120) of wall (920) comprising a length (Lx") is indicated in a distinct color, for example red color, indicating pending removal of the wall portion. Initially, the dimensions of the inner rectangle of the drawing cursor are entirely determined by the positioned pivot region and the position cursor. FIG. 11 furthermore shows three distance indicators from the free corner of the drawing cursor. The user may constrain a first distance by overwriting the numerical value of the corresponding distance indicator (1191), e.g. to 3 m (numerical value 3000), as has been performed at the particular instance shown in FIG. 11. The remaining unconstrained distance remains, at first, determined by the position cursor, and may, subsequently, also be constrained by the user. At the particular instance shown in FIG. 11, the position cursor is located tangent to or inside wall (520'''), and a distance indicator (1190', 1191') for a wall to be inserted in between walls (920) and (520''') therefore indicates the distance in between these walls.

Figure 12:
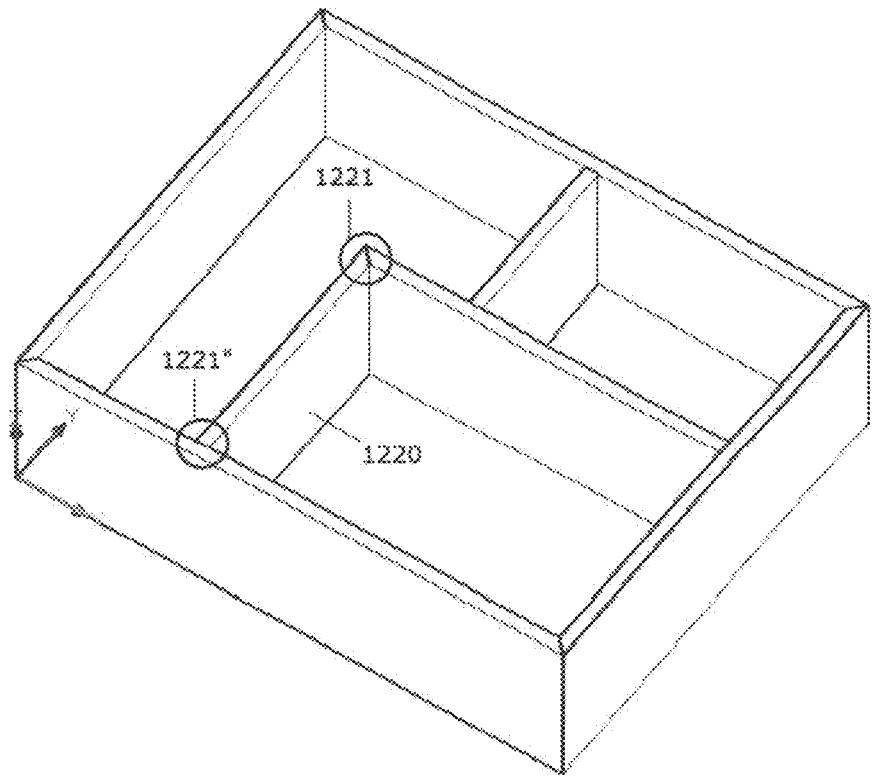

Upon constraining the distances and obtaining confirmation via a user input device, e.g. by clicking a computer mouse button, wall portion (1120) is removed from the CAD model and a new wall (1220) is inserted into the CAD model, on top of the slab, yielding the situation as displayed in FIG. 12. The connections (1221, 1221") between the walls are adjusted automatically according to the predetermined heuristic set of rules.

Figure 13:
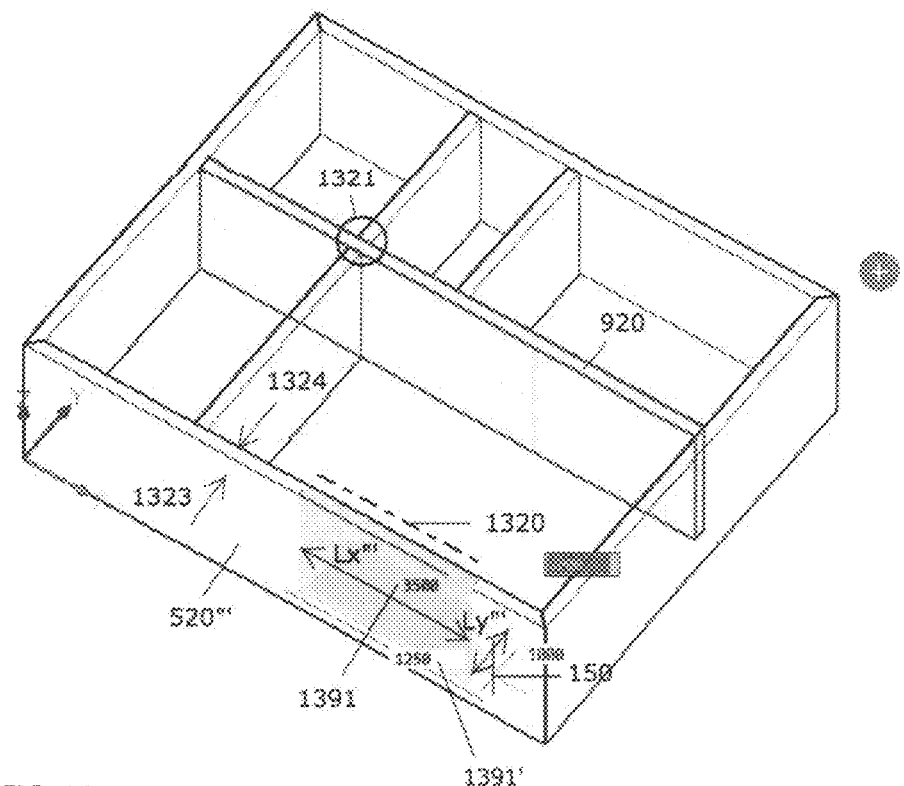

Reference is made to FIG. 13. Two walls have been added with respect to FIG. 12. Connection (1321) is thereby adjusted so that the collinear walls with the largest total length are joined into one long wall (920) and the end faces of the other walls are adjusted to coincide with the corresponding reference faces of the joined wall (920). Wall (520''') comprises a first reference face (1323) and a second reference face (1324), defining a first side of the wall and a second side of the wall, respectively. Prior to the situation displayed in FIG. 13, an edge part of the room cursor has been shown to snap into wall (520''') from the first side, which corresponds with the outside of the building story, and confirmation of the positioning of the pivot region in this wall has been obtained via a user input device. Subsequently, a drawing cursor has been obtained, and the position cursor moved to the second side of the wall (520'''), i.e. the inside of the building story, and in particular a corner sector of the pivot region, arriving at the situation displayed in FIG. 13. A wall portion (1320) of wall (520''') comprising a length Lx''' is indicated in a distinct color, for example in red color, indicating pending removal of the wall portion. Upon obtaining a position in said corner sector, for example via clicking a mouse button, wall portion (1320) is removed and three new wall portions (1420, 1420', 1420"), corresponding to the drawing cursor indications, are inserted, as displayed in FIG. 14. The corresponding connections (1421, 1421', 1421", 1421''') between the perpendicularly joining walls are adjusted, according to the predetermined heuristic set of rules, to 45° miters. As wall portion (1320) was part of an outer wall of the building story, the slab (594) is adjusted accordingly, to slab (1494). Thereby a slab portion of size (Lx''') by (Ly''') was removed (see 1495).

Figure 14:
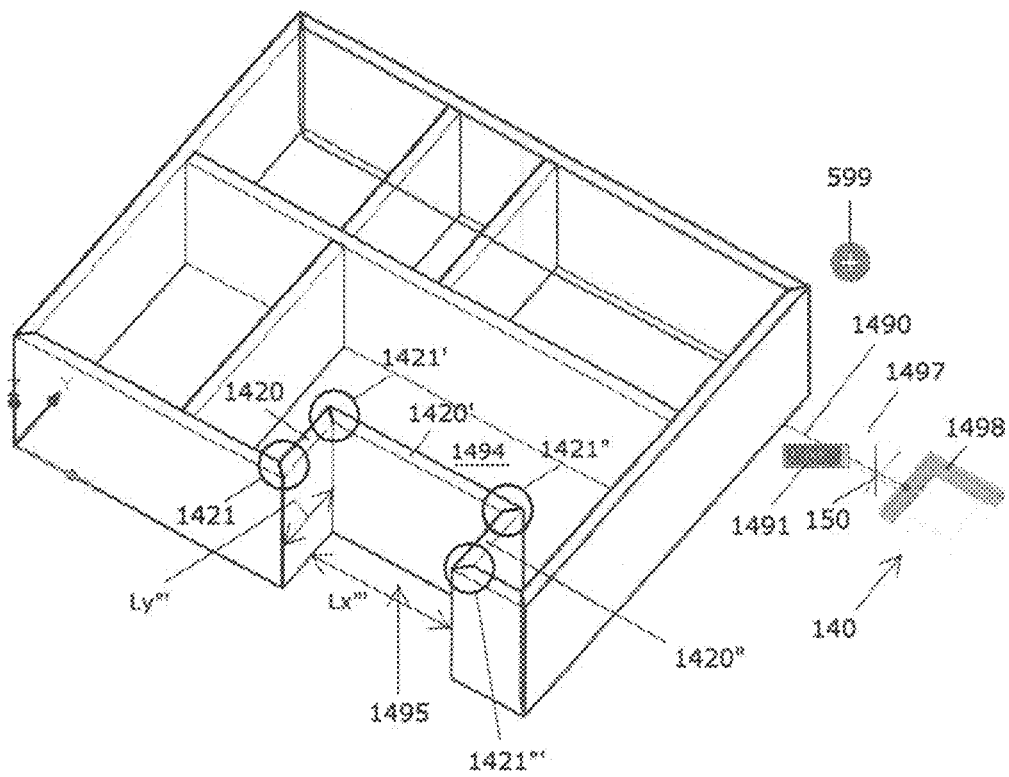
Figure 15:
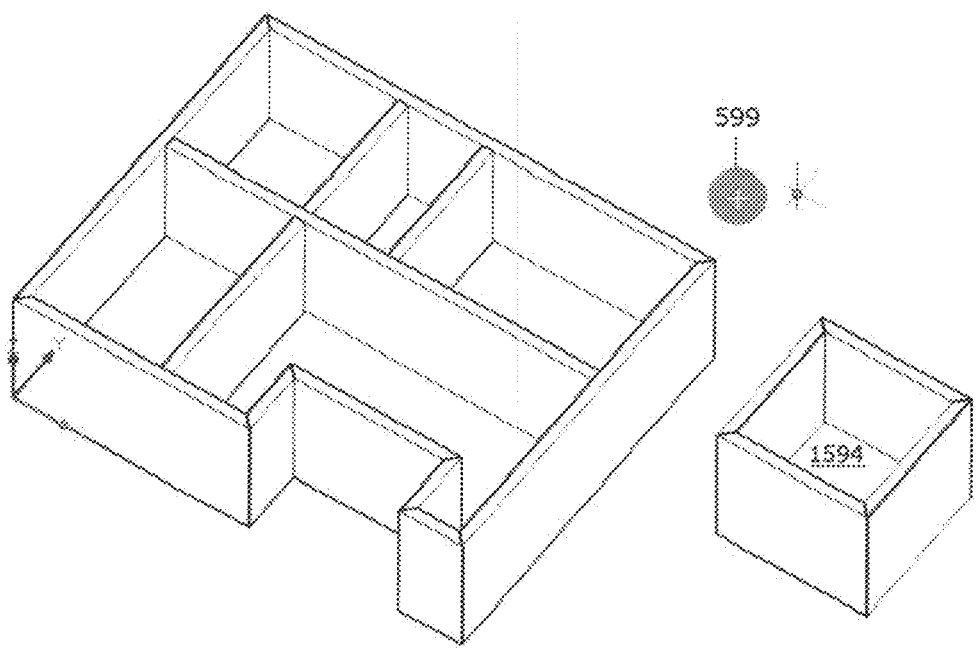
Figure 16:
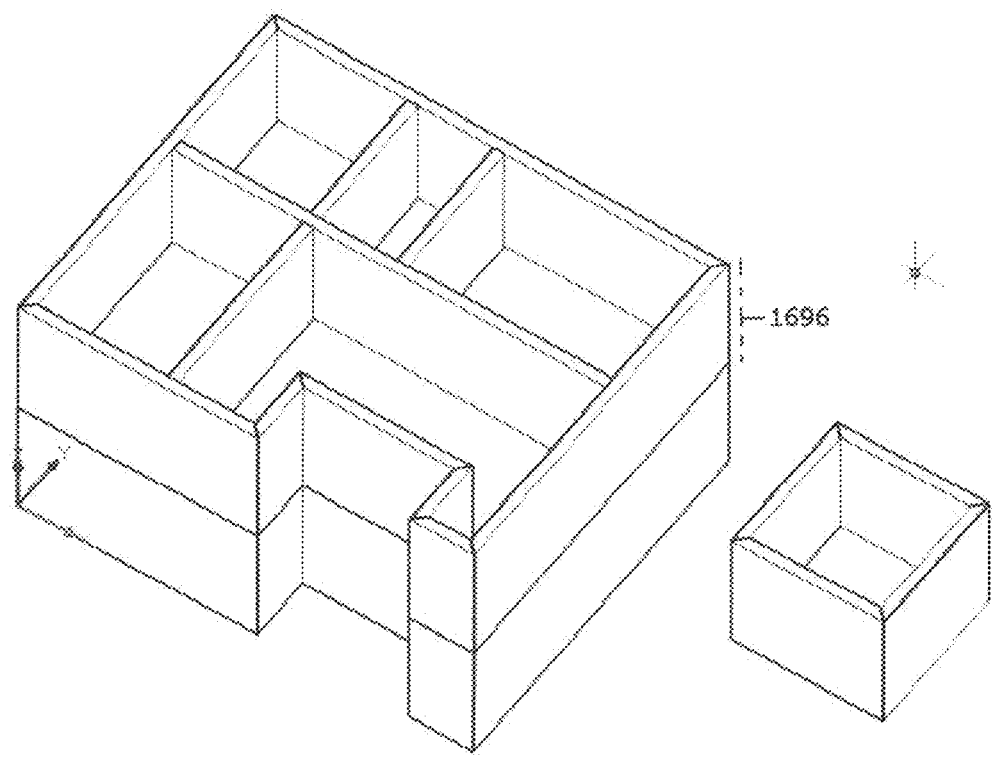

In FIG. 14, the position cursor (150) and the room cursor (140) are positioned outside of the building story, in a plane at base height. One edge part of the band of the room cursor is shown to be snapped into a position along direction (102, Y) corresponding to wall (520'). An indicative extension (1497) of said wall (520') is thereby displayed. A distance indicator (1490, 1491) in between an outer rim of an edge part of the band of the room cursor and wall (520") is furthermore displayed, and in the particular situation displayed in FIG. 14, the corresponding distance is constrained, e.g. to 2.5 m (numerical value 2000). Upon obtaining a confirmation of the positioning of the pivot region, at present indicated by the emerging three-dimensional snap walls (1498) on top of the fixed edge parts, a drawing cursor is displayed, allowing to draw a new building story, such as, for example, the new building story displayed in FIG. 15. Corresponding with the insertion of the four outer sidewalls of the new building story, a new slab (1594) is inserted as well. Upon movement of the position cursor onto the addition widget (599) of the former building story, and selecting the addition widget via a computer mouse button, a duplicate (1696) of the former building story is added on top of the former building story, as shown in FIG. 16.

The present invention may relate to any one or multiple of the following points:
1) A computer-implemented method for wall drawing in a computer-aided design model, the model comprising a height direction, the method comprising the steps of:
    obtaining a polygonal pivot region in a plane perpendicular to the height direction, wherein the polygonal pivot region comprises multiple outer edges each defining a line, said lines partitioning the plane into multiple sectors, each sector associated with a drawing operation;

obtaining a position in a sector of the plane via a user input device;

automatically performing the drawing operation associated with said sector, wherein the drawing operation comprises inserting, removing and/or repositioning one or more walls and/or wall portions, each extending in the height direction and comprising a length perpendicular to the height direction based on said position.

2) A computer-implemented method as described in preceding point 1 above, comprising the step of obtaining a wall thickness, wherein the polygonal pivot region is a square pivot region comprising four outer edges each comprising an edge length equal to said wall thickness, each edge defining a line, said lines partitioning the plane into nine sectors.

3) A computer-implemented method as described in preceding point 2 above, wherein obtaining a square pivot region in a plane perpendicular to the height direction comprises:

displaying via a visualization means a planar room cursor perpendicular to the height direction, the room cursor comprising a rectangle and a band around the rectangle, the band comprising four edge parts each comprising a width equal to said wall thickness;

obtaining a translation for the room cursor within the model via a user input device; and determining a pivot region based on the translated room cursor.

4) A computer-implemented method as described in preceding point 3 above, wherein the model comprises a wall which comprises two parallel reference faces parallel to the height direction and a thickness in between the two reference faces equal to said wall thickness, wherein said two reference faces are parallel to an outer rim of an edge part of the band, wherein the edge part is displayed via the visualization means to snap into the wall upon intersection of the edge part with the wall.

5) A computer-implemented method as described in any one of preceding points 3 and 4 above, wherein the model comprises a wall which comprises a reference face parallel to the height direction and parallel to an outer rim of an edge part of the band, wherein a distance indicator is displayed via the visualization means between the outer rim of the edge part of the band and the reference face of the wall upon spatial separation between the room cursor and the reference face of the wall, and wherein the method comprises the step of constraining the distance between the outer rim of the edge part of the band of the room cursor and the reference face of the wall.

6) A computer-implemented method as described in any one of preceding points 3 to 5 above, wherein the model comprises a coordinate system comprising an origin, a height direction, and two mutually orthogonal horizontal directions, each horizontal direction parallel to an outer rim of an edge part of the band of the room cursor, whereby two outer rims of edge parts of the band are displayed via the visualization means to snap onto the origin of the coordinate system in case of a distance between each of said translated outer rims and said origin smaller than a predefined threshold.

7) A computer-implemented method as described in any one of preceding points 4 to 6 above, wherein:

two non-parallel edge parts of the band are fixed based on snapping or constraining a distance, whereby the pivot region is positioned in the band at the corresponding corner of the two fixed edge parts;

one edge part of the band is fixed based on snapping or constraining a distance, whereby the pivot region is positioned in the band and centrally in the fixed edge part; or zero edge parts of the band are fixed, whereby the pivot region is positioned centrally in the rectangle of the room cursor.

8) A computer-implemented method as described in any one of preceding points 2 to 7 above, wherein said nine sectors comprise a central pivot sector, four corner sectors and four edge sectors, whereby:

the central pivot sector is associated with a void drawing operation;

each corner sector is associated with a room or building drawing operation comprising the insertion, removal and/or repositioning of multiple walls and/or wall portions; and each edge sector is associated with a wall drawing operation involving the insertion or removal of one wall and/or wall portion.

9) A computer-implemented method as described in preceding points 4, 7 and 8 above, wherein the square pivot region is located inside the wall, wherein the rectangle of the room cursor comprising the snapped edge part is positioned at a first side of the wall, wherein the method comprises the first set of steps comprising the steps of:

obtaining a position in a corner sector via a user input device, said position on a second side of the wall obverse to the first side;

removing said wall or a portion of said wall; and inserting two or more walls and/or wall portions based on said obtained position, or the second set of steps comprising the steps of:

obtaining a position in a corner sector via a user input device, said position on the first side of the wall; and inserting two or more walls and/or wall portions based on said obtained position, at least one of which is connected to said wall comprising the pivot region.

10) A computer-implemented method as described in preceding point 8 above, wherein the square pivot region is located inside the wall, wherein the method comprises the steps of:

obtaining a position in an edge sector via a user input device, said position inside said wall; and removing a wall portion of said wall comprising a length and a location based on said pivot region and said position.

11) A computer-implemented method as described in any one of the preceding points above, wherein a connection type between at least two walls is automatically adjusted upon obtaining said position which triggers said drawing operation involving at least one of said at least two walls based on a predetermined heuristic set of rules.

12) A computer-implemented method as described in any one of the preceding points above, wherein the model comprises a base height and zero, one or more slabs, wherein the pivot region is obtained via a horizontal translation within the model via a user input device, wherein said plane is tangent to a top face of a slab in case said horizontal translation within the model corresponds to a horizontal position associated with a slab and said plane is positioned at the base height otherwise, wherein said drawing operation comprises:
leaving the slab unchanged, adjusting the slab, or removing the slab in case said plane is tangent to a top face of said slab; and
inserting a slab in case said plane is positioned at the base height.
13) A computer-implemented method as described in any one of the preceding points above, wherein the model comprises a building story comprising a slab and one or more walls, wherein the method comprises the steps of:
optionally, displaying via a visualization means an addition widget in conjunction with the building story;
obtaining a selection of an addition action via a user input device, optionally via said addition widget; and
inserting a duplication of said building story, preferably on top of said building story.
14) A computer system for wall drawing in a computer-aided design model, the computer system configured for performing the computer-implemented method as described in any one of the preceding points 1 to 13 above.
15) A computer program product for wall drawing in a computer-aided design model, the computer program product comprising instructions which, when the computer program product is executed by a computer, cause the computer to carry out the computer-implemented method as described in any one of preceding points 1 to 13 above.

The invention has been illustrated above by a non-limiting example in conjunction with FIGS. 1, 2, and 4 to 16, which illustrates the invention, and is not intended to, nor should it be interpreted to, limit the scope of the invention. In what follows, a further non-limiting example of the methodology is provided to further illustrate the invention, and which is not intended to, nor should it be interpreted to, limit the scope of the invention.

QUICKDRAW command in BricsCAD (BIM) V19

In BricsCAD (BIM) V18, the BOX and POLYSOLID commands can be used to create buildings with vertical walls. However, the commands need to be used a dozen times and with great care. The present example describes the command QUICKDRAW, an embodiment according to the present invention, as implemented in BricsCAD (BIM) V19, with scheduled public release after the priority date of the present document. The command QUICKDRAW enables users to create a simple building with only a few computer mouse clicks.

Room Cursor, Magnetic Snapping, and Editable Dimensions

When starting the QUICKDRAW command, a transparent blue 1 m×1 m square (154) is attached to the mouse cursor (position cursor). This visualization is part of the room cursor (140), a central object within the QUICKDRAW command, containing geometrical information for the placement of walls and slabs (see FIG. 1).

Around this central square, there is a band (160, 161, 162, 163, 180, 181, 182, 183) of the wall thickness (t). This region is used for the magnetic behavior w.r.t. existent walls. When moving the room cursor perpendicular towards an existent wall, the square (154) is shifted to that wall when the outer edge of the band starts overlapping the wall. At that point, it is said the room cursor is snapped to that wall. Next to magnetic snapping to existing walls, it is also possible to snap to the origin (100) of the drawing. In that case, the room cursor is positioned in the first quadrant of the XY-plane, perpendicular to the height direction. As such, it is made very easy and encouraging to start a model at (0, 0, 0). To make clear whether the room cursor is snapped along one or two edges, so called three-dimensional snap walls (298) are shown to emerge. This is depicted in FIG. 2 for origin snapping.

Besides the magnetic snapping, there is another way to specify the location of the room cursor, i.e. the distance indicators or so-called shooter dimensions (590, 591). These dimensions have start points in the centers of the outer edges of the room cursor, and are "shot" towards the closest parallel walls, if any. These shooter dimensions are only shown when such a parallel wall is visible in the current view. The dimensions are dynamic and editable, which means they can be edited one by one. When typing a dimension and pressing TAB/ENTER, it is constrained and the edit box is colored red. Of course, only one dimension in each direction can be constrained, so a constrained dimension is released when the opposite one is constrained.

When clicking a first time, a small square with side length the wall thickness, the so-called pivot, is placed based on the fixed edges (by snapping or constraining dimensions). As such, the pivot has nine possible locations w.r.t. the initial room cursor (see FIG. 3):
If the room cursor is fixed in the two directions, e.g. by snapping to the origin or by fixing two (perpendicular) shooter dimensions, the pivot is placed in that corner of the room cursor;
if the room cursor is fixed in only one direction, e.g. by snapping to an existent wall, the pivot is placed in the middle of that room cursor's edge;
if the room cursor is not fixed, the pivot is placed in the center of the initial room cursor.

At the moment the pivot is fixed by clicking a first time (confirmation), the room/building extending mode (drawing mode) is activated. The size of the room cursor is no longer fixed (drawing cursor), but is adapted based on the location of the fixed pivot and the mouse cursor. In drawing mode, there are also (up to) four dimensions present: the length and width (inner dimensions) of the room/building, and two shooter dimensions-resp. X- and Y-aligned—starting from the loose corner of the extending room cursor, shot at the closest parallel wall, if any. Together with the magnetic snapping, as described above, it is possible to dimension the future room/building as desired. (See FIG. 4.)

Room and Building Creation

When clicking a second time, the information in the current room cursor (drawing cursor) is used to create slabs and walls, add BIM data to them and place them in the drawing (CAD model). If the room cursor is at zero elevation, (up to) four outer walls are created and a slab is placed between these walls, resulting in a new building. This last case is depicted in FIG. 5. However, if the room cursor resides on an existent slab, only (inner) walls are placed and thus a room is created.

The wall placement behaves intelligently, as the walls will only be placed in the first lump of the room cursor (drawing cursor). To make this more concrete, when the (extending) room cursor (drawing cursor) is cut by existent walls, only the part of room cursor in which the pivot resides, is taken into account for wall placement. This results in walls being "cut" at present walls.

Finishing Connections

At junctions of multiple walls, the QUICKDRAW command intelligently fixes the connection between them. The different use cases are listed:

- If a wall A joins a wall B in a T-connection (so the end face of wall A touches a reference face of wall B while the end faces of wall B don't touch wall A), the touching end face of wall A is tweaked to the reference face of wall B.
- If two walls are equally thick and join colinearly, they are unioned into one long wall.
- If a wall A joins a wall B such that one end face of wall A joins an end face of wall B in a certain angle, the two end faces are tweaked into the plane through the intersection line, with half the angle of the connection. For two walls joining perpendicularly, this result in clean 45° miters.
- If three walls join in a T connection, the two colinear and equally thick legs are unioned and the touching end face of the perpendicular leg is tweaked such that it lies in the reference face of the new long wall.
- If four walls join in a + connection with two pairs of colinear and equally thick walls, the pair with the longest total length is searched and then unioned together, while the touching end faces of the two perpendicular walls are tweaked in the reference face of the new long wall.

The Pivot and Partial Wall Movement

In the section about the room cursor, the pivot was introduced. This is a small square with side length the wall thickness, which is always fixed in room/building extending mode (drawing mode). This means there are nine sectors in which the mouse cursor can reside w.r.t. the pivot. The result of clicking a second time depends on the location of the mouse cursor w.r.t. these nine sectors:

- If the mouse cursor is in one of the four corner/quadrant sectors, a room/building is created (depending on the elevation of the room cursor);
- if the mouse cursor is in one of the four edge sectors, no room/building can be created, and only a single wall is placed;
- if the mouse cursor is inside the pivot sector itself, nothing happens when clicking the second time.

Working with this pivot logic yields an extra advantage, i.e. (partial) wall movement. When snapping to one side of an existent wall and clicking a first time; the pivot is fixed inside that wall (at one of the three possible positions along that snap edge, depending on snapping/constrained dimensions in the other direction). When moving the loose corner of the room cursor (drawing cursor) to the other side of the snapped wall, the room cursor (drawing cursor) partially "breaks through" that wall. After clicking a second time, that part of the wall is removed and new walls are created along the other edges of the room cursor (drawing cursor). Only the wall(s) overlapping the room cursor's (drawing cursor's) pivot can be adapted. As such, at most two walls can be (partially) (re)moved during one QUICKDRAW action. This partial wall movement is accompanied by a red visualization over the part(s) of the wall(s) to be removed (see FIGS. 10 and 11).

Story Duplication

As a final feature of the QUICKDRAW command, each building in the model gets a "+" widget (addition widget), attached to the top floor of the building. This is an application of the Widget API, using the model-view separation. Clicking this button results in copying the top floor of this building. This means all walls and slabs assigned to the relevant building and story are cloned, a new story is created and these new objects are assigned to that new story.

Exemplary Tutorial of the QUICKDRAW Command

1. Start the QUICKDRAW command, the room cursor appears, attached to the mouse cursor (FIG. 1).
2. Snap the room cursor to the origin. Snapwalls in the bottom left corner emerge (FIG. 2).
3. Click a first time and extend a building. Use the editable dynamic dimensions to set the length and width of the building to resp. 10 m and 8 m. These dimensions are inner dimensions, i.e. dimensions between the walls to be placed (FIG. 4).
4. As a result, a building with one floor, a ground slab and four outer walls that are cleanly mitered, is created. Without leaving the QUICKDRAW command, the initial room cursor appears again. When moving the mouse onto the newly created slab, the elevation of the room cursor is adapted to the slab height. Four shooter dimensions are shot from the outer edges of the room cursor to the closest parallel walls (FIG. 5).
5. Now snap the room cursor at the inner side of the top left corner of the newly created building. The two walls at which the room cursor is snapped, are highlighted (FIG. 6).
6. Extend the room starting from the top left corner. The dimensions are specified by a length of 5 m and an inner distance to the wall along the X-axis of 4.5 m. This constrained dimension is emphasized by a snapwall at the constrained edge and by highlighting the wall (FIG. 7).
7. In the same way, a second room is quick-drawn, in line with the first room (FIG. 8).
8. When finishing this second room, the connection of the three walls forming a T connection is properly fixed (FIG. 9).
9. Fix the room cursor to the inner bottom left corner of the first room (FIG. 10).
10. Click a first time to fix the pivot in the corner of the two walls to which the room cursor is snapped. Then move the loose room cursor (drawing cursor) corner to the "open space" of the building, so move to the bottom right quadrant (corner sector) with respect to the pivot. Now, the room cursor (drawing cursor) is "breaking through" the X-aligned wall at which it was snapped, made clear by the red visualization. Snap the extending room cursor (drawing cursor) to the outer wall along the X-axis (FIG. 11).
11. Click the second time. The part of the wall colored red is (re)moved; as such an L-shaped room is created (FIG. 12).
12. Fix the room cursor again to the inner top left corner of the building, click and extend it to the corner of the L-room. When clicking a second time, two new walls are created, forming a cross connection with the two existing walls of the L-room. This cross connection is finished properly (FIG. 13).
13. The partial wall movement tool is now used to move a part of an outer wall. Fix the room cursor at the outer side of the outer wall of the building (the one along the X-axis). Click to fix the pivot and move the loose corner of the room cursor (drawing cursor) to the top right corner region w.r.t. the pivot, i.e. over the outer wall, in the building. Now, not only part of the outer wall is colored red, but also the inner rectangle of the room cursor (drawing cursor) itself. This indicates the underlying slab will be removed partially beneath the room cursor (drawing cursor) (FIG. 13).

14. The result is indeed that the outer wall is partially (re)moved, the slab is cut out and three new outer walls are placed and properly mitered. Now, we want to place a new small side building. The room cursor is snapped to the X-aligned wall upper wall of the building, and constrained at 2.5 m from the M-aligned right outer wall of the building. As expected, snapwalls emerge and the two fixed walls are highlighted. To indicate the snapping in line with the X-aligned wall, a light blue strip is drawn (FIG. 14).

15. Create a small side building of 3 m by 3 m by constraining the length and width dimensions (FIG. 15).

16. Click the plus sign of the main building. The top floor (which is here the ground floor) is duplicated (FIG. 16).

The invention claimed is:

1. Computer-implemented method for direct room modeling in a computer-aided design model, wherein the model comprises a rectangular coordinate system comprising mutually orthogonal height, first horizontal and second horizontal directions, wherein the method comprises the steps of:
 obtaining a wall thickness;
 obtaining a first position within the model by fixing a square pivot region relative to the model via a user input device, wherein a plane perpendicular to the height direction comprises the pivot region, wherein the pivot region comprises four pivot edges each comprising an edge length equal to said wall thickness, wherein each pivot edge defines a line, wherein said lines partition the plane into nine sectors, wherein each sector is associated with a room drawing operation;
 obtaining a second position within a sector of said nine sectors via a user input device;
 automatically performing the room drawing operation associated with the sector comprising the second position, wherein the first and second positions define a rectangle perpendicular to the height direction and aligned with the horizontal directions, wherein the rectangle comprises edges and corners, wherein the rectangle comprises the first and second positions at diagonally opposite corners, wherein the room drawing operation comprises inserting and/or removing one or more walls and/or wall portions, each extending in the height direction and along an edge of the rectangle over in essence the full length of the edge.

2. Computer-implemented method according to claim 1, wherein obtaining said first position within the model comprises the step of obtaining a horizontal position via the user input device, wherein the model comprises a base height and zero, one or more slabs, wherein said first position is based on said horizontal position, wherein said first position is in a top face of a slab in case a slab is present at said horizontal position and wherein said first position is at the base height otherwise.

3. Computer-implemented method according to claim 2, wherein the slab is present and tangent to multiple outer walls with the slab in between, wherein the model comprises zero, one or more inner walls on top of the slab, wherein the room drawing operation comprises:
 inserting four outer walls and inserting the slab in between the four outer walls in case the first position is at the base height;
 leaving the slab unchanged in case the first position is at the top face of the slab and the room drawing operation does not involve inserting or removing outer walls and/or outer wall portions; and
 adjusting or removing the slab in case the first position is at the top face of the slab and the room drawing operation involves inserting and/or removing outer walls and/or outer wall portions.

4. Computer-implemented method according to claim 1, wherein obtaining said first position and subsequently said second position within the model via the user input device comprises the steps of:
 obtaining said first position within the model via the user input device;
 dynamically obtaining a series of tentative second positions within the model via the user input device, wherein the first position and a tentative second position define a tentative rectangle perpendicular to the height direction and aligned with the first and second horizontal directions, wherein the tentative rectangle comprises edges and corners, wherein the tentative rectangle comprises the first position and the tentative second position at diagonally opposite corners;
 dynamically displaying via a visualization means a series of tentative rectangles corresponding in time with said dynamically obtained series of tentative second positions; and
 obtaining a second position and/or rectangle by obtaining a confirmation of a tentative second position and/or tentative rectangle via a user input device.

5. Computer-implemented method according to claim 1, wherein said nine sectors comprise a central pivot sector, four corner sectors and four edge sectors, whereby:
 the central pivot sector is associated with a void drawing operation;
 each corner sector is associated with a drawing operation comprising the insertion and/or removal of multiple walls and/or wall portions; and
 each edge sector is associated with a drawing operation comprising the insertion or removal of one wall and/or wall portion.

6. Computer-implemented method according to claim 1, wherein the step of obtaining said first position in the model via the user input device comprises the steps of:
 displaying via a visualization means a planar rectangular room cursor comprising an inner rectangle and an outer band around the inner rectangle, the outer band comprising four edge parts, each edge part comprising a width equal to the wall thickness, whereby the room comprises a tentative cursor position which dynamically depends on a tentative first position within the model dynamically obtained via the user input device and/or which is at least partially constrained by one or two non-parallel snapped or constrained edge parts;
 fixing a pivot region relative to the model by obtaining a confirmation of the tentative cursor position via the user input device, whereby:
 in case of no snapped or constrained edge parts, the pivot region is fixed at a position centrally in the inner rectangle;
 in case of one snapped or constrained edge part, the pivot region is fixed at a position centrally in the one edge part; and
 in case of two non-parallel snapped or constrained edge parts, the pivot region is fixed at a position of the corresponding corner of the two edge parts.

7. Computer-implemented method according to claim 6, wherein the model comprises a wall which comprises two parallel reference faces parallel to the height direction and a thickness in between the two reference faces equal to said wall thickness, wherein said two reference faces are parallel to an outer rim of an edge part of the outer band, wherein the edge part is displayed via the visualization means to snap into the wall upon intersection of the edge part with the wall.

8. Computer-implemented method according to claim 6, wherein the model comprises a wall which comprises a reference face parallel to the height direction and parallel to an outer rim of an edge part of the band, wherein a distance indicator is displayed via the visualization means between the outer rim of the edge part of the band and the reference face of the wall upon spatial separation between the room cursor and the reference face of the wall, and wherein the method comprises the step of constraining the distance between the outer rim of the edge part of the band of the room cursor and the reference face of the wall.

9. Computer-implemented method according to claim 6, wherein the rectangular coordinate system comprises an origin, wherein each horizontal direction is parallel to an outer rim of an edge part of the band of the room cursor, whereby two outer rims of edge parts of the band are displayed via the visualization means to snap onto the origin of the coordinate system in case of a distance between each of said translated outer rims and said origin smaller than a predefined threshold.

10. Computer-implemented method according to claim 7, wherein the pivot region is located inside the wall, wherein the inner rectangle of the room cursor comprising the snapped edge part is positioned at a first side of the wall, wherein:
  in case the second position lies in a corner sector on a second side of the wall obverse to the first side, said wall or a portion of said wall is removed; and two or more walls and/or wall portions are inserted on the second side of the wall based on said second position;
  in case the second position lies in a corner sector on the first side of the wall, two or more walls and/or wall portions are inserted on the first side of said wall based on said second position, at least one of which is connected to said wall; and
  in case the second position lies in an edge sector and inside said wall, removing a wall portion of said wall comprising a length and a location based on said pivot region and said second position.

11. Computer-implemented method according to claim 1, wherein a connection type between at least two walls is automatically adjusted based on a predetermined heuristic set of rules upon obtaining said second position which triggers said drawing operation involving at least one of said at least two walls.

12. Computer-implemented method according to claim 1, wherein the model comprises a building story comprising a slab, multiple outer walls and zero, one or more inner walls, wherein the method comprises the steps of:
  displaying via a visualization means an addition widget in conjunction with the building story;
  obtaining a selection of the addition widget via a user input device; and
  automatically inserting a duplication of said building story upon obtaining said selection of said addition widget.

13. Computer system for direct room modeling in a computer-aided design model, the computer system configured for performing the computer-implemented method according to claim 1.

14. One or more non-transitory computer readable media storing instructions that in response to being executed by one or more processors, cause a computer system to perform operations, the operations comprising the computer-implemented method according to claim 1.

15. The method of claim 1, further comprising inserting a semantic classification for an inserted wall and/or wall portion.

16. The method of claim 3, further comprising inserting a semantic classification for the inserted slab.

* * * * *